(12) United States Patent
Heiderich et al.

(10) Patent No.: US 10,518,379 B2
(45) Date of Patent: Dec. 31, 2019

(54) GRINDING MACHINE, AND METHOD FOR MACHINING A FEATHERED EDGE OF A ROTOR BLADE

(71) Applicant: SIEMENS AKTIENGESELLSCHAFT, München (DE)

(72) Inventors: Julian Philip Heiderich, Duisburg (DE); Karsten Schäffer, Oberhausen (DE); Stefan Sellmann, Essen (DE); Marat Visajtaev, Bottrop (DE); Felix Vogt, Oberhausen (DE)

(73) Assignee: SIEMENS AKTIENGESELLSCHAFT (DE)

( * ) Notice: Subject to any disclaimer, the term of this patent is extended or adjusted under 35 U.S.C. 154(b) by 125 days.

(21) Appl. No.: 15/557,240

(22) PCT Filed: Mar. 21, 2016

(86) PCT No.: PCT/EP2016/056095
§ 371 (c)(1),
(2) Date: Sep. 11, 2017

(87) PCT Pub. No.: WO2016/156080
PCT Pub. Date: Oct. 6, 2016

(65) Prior Publication Data
US 2018/0050435 A1 Feb. 22, 2018

(30) Foreign Application Priority Data
Mar. 27, 2015 (DE) .................... 10 2015 205 624

(51) Int. Cl.
*B24B 21/16* (2006.01)
*B24B 21/12* (2006.01)
*B24B 19/14* (2006.01)

(52) U.S. Cl.
CPC ............ *B24B 21/165* (2013.01); *B24B 19/14* (2013.01); *B24B 21/12* (2013.01); *B23Q 2210/006* (2013.01)

(58) Field of Classification Search
CPC ......... B24B 9/00; B24B 19/14; B24B 21/002; B24B 21/0012; B24B 21/165
See application file for complete search history.

(56) References Cited

U.S. PATENT DOCUMENTS 4,309,848 A * 1/1982 Arrigoni ................. B23P 6/002
451/125
4,813,187 A * 3/1989 Mushardt .................. B24B 1/00
451/130

(Continued)

FOREIGN PATENT DOCUMENTS

DE 19538663 A1 4/1996

OTHER PUBLICATIONS

International Search Report for PCT/EP2016/056095; 2 pgs.
Decision to Grant in related Korean Patent Application No. 10-2017-7030561 dated Oct. 29, 2019; 3 pages.

*Primary Examiner* — Timothy V Eley
(74) *Attorney, Agent, or Firm* — Schmeiser, Olsen & Watts LLP

(57) ABSTRACT

Provided is a grinding machine for processing a sweep edge of a rotor blade, including a grinding unit with a driven grinding tool, a workpiece receiving device which is designed for receiving a rotor blade to be ground, and a workpiece drive unit which is configured for moving the workpiece receiving device, with a rotor blade received thereon, relative to the grinding tool for the purpose of machining the sweep edge, wherein the workpiece drive unit has a pivot axis at which the workpiece receiving device is held in such a way that the sweep edge of a rotor blade received thereon is engaged with the grinding tool in the (Continued)

course of a pivot movement of the workpiece receiving device about the pivot axis.

19 Claims, 5 Drawing Sheets

(56) References Cited

U.S. PATENT DOCUMENTS 9,616,543 B2 * 4/2017 Genz ................... B24B 21/165
2005/0221735 A1 10/2005 Toft

* cited by examiner

GRINDING MACHINE, AND METHOD FOR MACHINING A FEATHERED EDGE OF A ROTOR BLADE

CROSS-REFERENCE TO RELATED APPLICATIONS

This application claims priority to PCT Application No. PCT/EP2016/056095, having a filing date of Mar. 21, 2016, based off of German application No. 10 2015 205624.4 having a filing date of Mar. 27, 2015, the entire contents both of which are hereby incorporated by reference.

FIELD OF TECHNOLOGY

The following relates to a grinding machine for machining a feathered edge of a rotor blade, comprising a grinding unit with a driven grinding tool, a workpiece mounting device, which is adapted for the mounting of a rotor blade which is to be ground, and a workpiece drive unit, which is designed to move the workpiece mounting device, together with a rotor blade mounted thereon, relative to the grinding tool for the purpose of metal-removing machining of the feathered edge. The following furthermore relates to a method for machining a feathered edge of a rotor blade, especially using such a grinding machine.

BACKGROUND

Rotor blades, as are used especially in gas turbines, are exposed to extreme conditions during operation, which is accompanied by a high degree of wear which is caused particularly by oxidation. Accordingly, it is necessary to regularly exchange worn rotor blades in the course of a gas turbine service for new or reconditioned rotor blades. The rotor blades which are to be newly fitted have to be individually adapted to the existing gas turbine at each construction site. In this case, the length of the rotor blade at the feathered edge is reduced in order to establish the distance between the feathered edge of the rotor blade and the gas turbine casing in such a way that during operation of the gas turbine a gap which is as small as possible is established in order to minimize undesirable gas losses.

When shortening the feathered edges of rotor blades grinding machines are normally used. These as a rule comprise a stationary grinding unit with a driven grinding tool, a workpiece mounting device, which is adapted for the mounting of a rotor blade to be ground, and a workpiece drive unit which is designed to move the workpiece mounting device, together with a rotor blade mounted thereon, relative to the grinding tool for the purpose of metal-removing machining of the feathered edge. The workpiece drive unit and the associated controlling of such grinding machines are designed in such a way that they enable a circular interpolation which is required in order to be able to produce the complex geometry of the feathered edge in the form of a tapered section.

SUMMARY

An aspect relates to creating an alternative grinding machine, and an alternative method of the type referred to in the introduction for machining a feathered edge of a rotor blade.

For achieving this aspect, embodiments of the present invention creates a grinding machine of the type referred to in the introduction which is characterized in that the workpiece drive unit has a pivot axis on which the workpiece mounting device is retained in such a way that the feathered edge of a rotor blade which is mounted on this is brought into engagement with the grinding tool in the course of a pivoting movement of the workpiece mounting device around the pivot axis. Thanks to such a pivot axis, the feathered edges of rotor blades can be provided with an extremely wide variety of tapered section shapes in a problem-free manner in a simple construction without complex CNC-controlled circular interpolation. To this end, the grinding machine according to embodiments of the invention simulates the actual installed situation of a rotor blade, wherein the workpiece mounting device represents the wheel disk, the pivot axis represents the wheel disk rotational axis and the grinding tool represents the gas turbine casing.

According to a first embodiment of the present invention, the grinding tool is a basically cylindrically designed grindstone which is rotationally driven around its longitudinal axis. Preferably, however, according to a second embodiment, a driven grinding belt is used as a grinding tool and is guided over a contact roller and also over at least one deflection roller. Such a belt grinder is advantageous to the effect that the grinding belt is comparatively inexpensive and can be exchanged in a quick and problem-free manner.

According to one embodiment of the present invention, a longitudinal axis of the grindstone or a longitudinal axis of the contact roller is arranged parallel to the pivot axis of the workpiece drive unit at least in a longitudinal-axis basic position. In such a longitudinal-axis basic position, feathered edges can be produced with outside diameters which are constant in the axial direction.

Provision is advantageously made for a pivoting device on which the grinding unit is pivotably mounted for adjusting the longitudinal axis of the grindstone or the longitudinal axis of the contact roller with regard to a longitudinal-axis basic position, wherein the pivot axis of the workpiece drive unit and the pivot axis of the pivoting unit are arranged preferably perpendicularly to each other. Thanks to such a pivoting device, feathered edges with a conically designed outside diameter in the axial direction can also be produced.

Provision is advantageously made for a vertically extending linear guide along which the grinding unit can move upward and downward. Accordingly, in the case of this embodiment of the grinding machine according to embodiments of the invention, the feed movement is realized via a movement of the grinding unit along the linear guide.

A suction head of a suction unit is advantageously arranged in the region of the grinding unit in order to remove grinding dust which accumulates during the grinding machining.

According to one embodiment of the present invention, the pivot axis of the workpiece drive unit is mounted in a stationary manner. In this way, a very simple construction is achieved.

Provision is advantageously made for an externally accessible machine booth in which the grinding unit and the workpiece mounting device are arranged. Such a machine booth serves on the one hand for safety of the operating personnel. On the other hand, it prevents contamination of the environment as a result of accumulating or non-sucked up grinding dust.

The machine booth advantageously has a cover plate on which the workpiece drive unit is arranged. In this way, a very simple and inexpensively producible construction of the grinding machine is achieved.

The grinding machine is of transportable design as a whole so that it can be taken without any problem to each construction site at which servicing operations on gas turbines are to be carried out. Therefore, the grinding machine can be provided with eyes or the like which serve for the fastening of lifting straps. Additionally or alternatively, the grinding machine can also have a bottom plate which is designed in such a way that it can be grabbed underneath by a forklift stacker.

For achieving the object referred to in the introduction, embodiments of the present invention also provides a method for machining a feathered edge of a rotor blade, especially using a grinding machine according to embodiments of the invention, in which the feathered edge of a rotor blade is brought into engagement with a grinding tool in the course of a pivoting movement of the rotor blade around a concrete pivot axis.

In the case of the method according to embodiments of the invention, the feathered edge is preferably brought into engagement with the grinding tool in the course of the pivoting movement in such a way that the feathered edge obtains the shape of a tapered section.

BRIEF DESCRIPTION

Some of the embodiments will be described in detail, with references to the following figures, wherein like designations denote like members, wherein.

DETAILED DESCRIPTION

Figure 1:
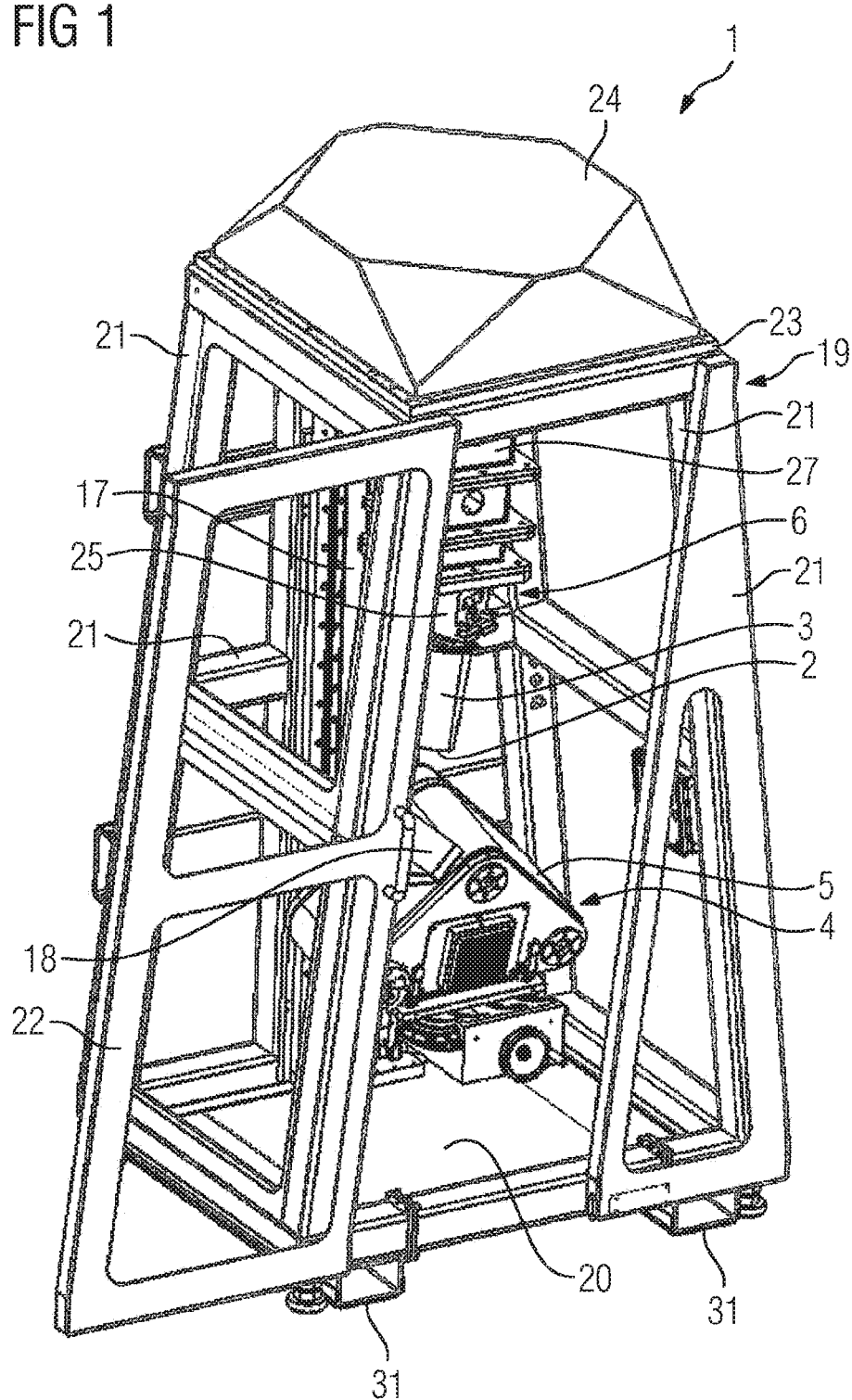
FIG. 1 shows a perspective view of a grinding machine according to an embodiment of the present invention.

The figures show a grinding machine 1 according to an embodiment of the present invention, which serves for machining a feathered edge 2 of a rotor blade 3.

As main components, the grinding machine 1 comprises a grinding unit 4 with a driven grinding tool 5, a workpiece mounting device 6, which is adapted for the mounting of a rotor blade 3 to be ground, and a workpiece drive unit 7, which is designed to move the workpiece mounting device 6, together with a rotor blade 3 mounted thereon, relative to the grinding tool 5 for the purpose of the metal-removing machining of the feathered edge 2 of the rotor blade 3.

The grinding unit 4 is designed as a belt grinder. It comprises a grinding belt as the grinding tool 5, which is guided over a contact roller 8 and also over two deflection rollers 9 and 10 and can be driven in a known manner via a drive, which is not shown in more detail. A carriage 11 of the grinding unit 4 is mounted in a movable and lockable manner on guide rails 12 and 13 of a pivoting device 14 which are arranged parallel to each other and of circle segment-like design so that the grinding unit 4 can be pivoted as a whole around a pivot axis 15. Accordingly, a longitudinal axis 16 of the contact roller 8, starting from a longitudinal-axis basic position in which the longitudinal axis 16 extends horizontally, can be adjusted as required in the course of a pivoting movement around the pivot axis 15. The pivoting device 14 is retained on a vertically extending linear guide 17 in a manner in which it can move upward and downward and be locked in optional positions. In this way, the grinding unit 4 can be moved upward and downward into optional pivoted positions. Arranged in the region of the contact roller 8 is a suction head 18 of a suction unit, which is not shown in more detail, wherein the width of the suction head 18 corresponds in the main to the width of the grinding tool 5.

The grinding unit 4, the pivoting device 14 and the linear guide 17 are arranged in a machine booth 19. This comprises a booth floor 20, sidewalls 21, an access door 22, a cover plate 23 and also a booth roof 24 which for covering the cover plate 24 is detachably fastened to this. The workpiece mounting device 6 is positioned above the grinding unit 4 inside the machine booth 19. The workpiece mounting device 6 comprises a clamping device 25 which is designed for accommodating and clamping a blade root 26 of the rotor blade 3. The clamping device 25, via an intermediate piece 27 which extends through an opening of the cover plate 24, is fixedly connected to a pivot axis 28 of the workpiece drive unit 7 which is arranged and supported on the outer side of the cover plate 23 of the machine booth 19. The pivot axis 28 of the workpiece drive unit 7 extends parallel to the longitudinal axis 16 of the contact roller 8, when this is in its longitudinal-axis basic position, and perpendicularly to the pivot axis 15 of the pivoting device 14. The pivot axis 28 is connected via a toothed belt 29 to a drive 30 which is also fastened on the outer side of the cover plate 23 so that the clamping device 25, together with a rotor blade 3 mounted thereon, can move back and forth via the drive 30 relative to the contact roller 8 of the grinding unit 4 in a pivoting manner around the pivot axis 28.

The grinding machine 1 is of transportable design as a whole. To this end, eyes, which are not shown in more detail, can be screwed on the cover plate 24 of the machine booth 19 and serve for the fastening of lifting straps so that the grinding machine 1 can be lifted using a crane. Furthermore, metal tubes 31 with rectangular cross section are fastened on the booth floor 20, the size and spacings of the metal tubes being selected in such a way that a stacker fork of a forklift stacker can be inserted into these. Accordingly, the grinding machine 1 can also be picked up and transported by means of a forklift stacker.

Figure 2:
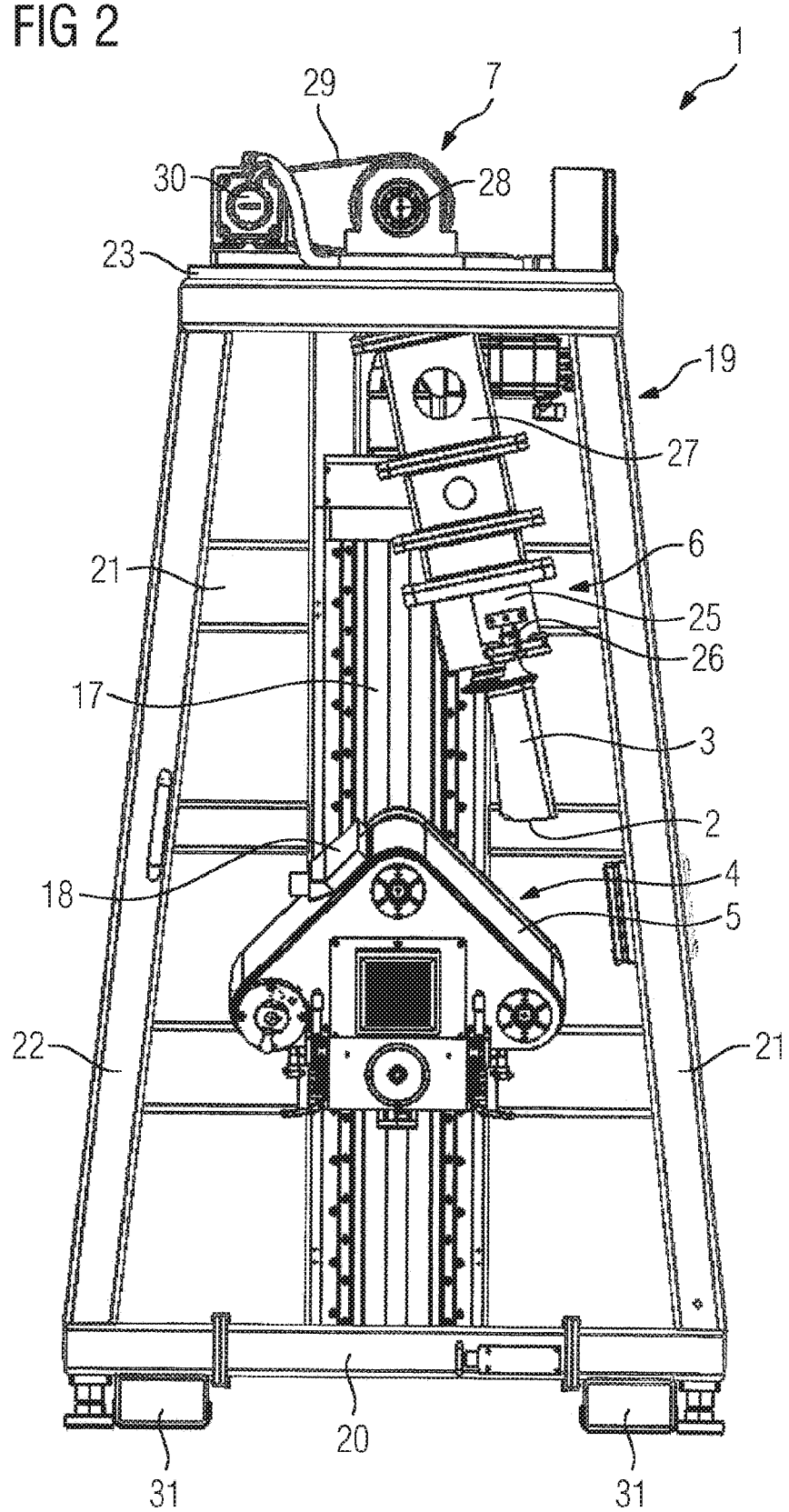
FIG. 2 shows a front view of grinding machine shown in FIG. 1.
Figure 3:
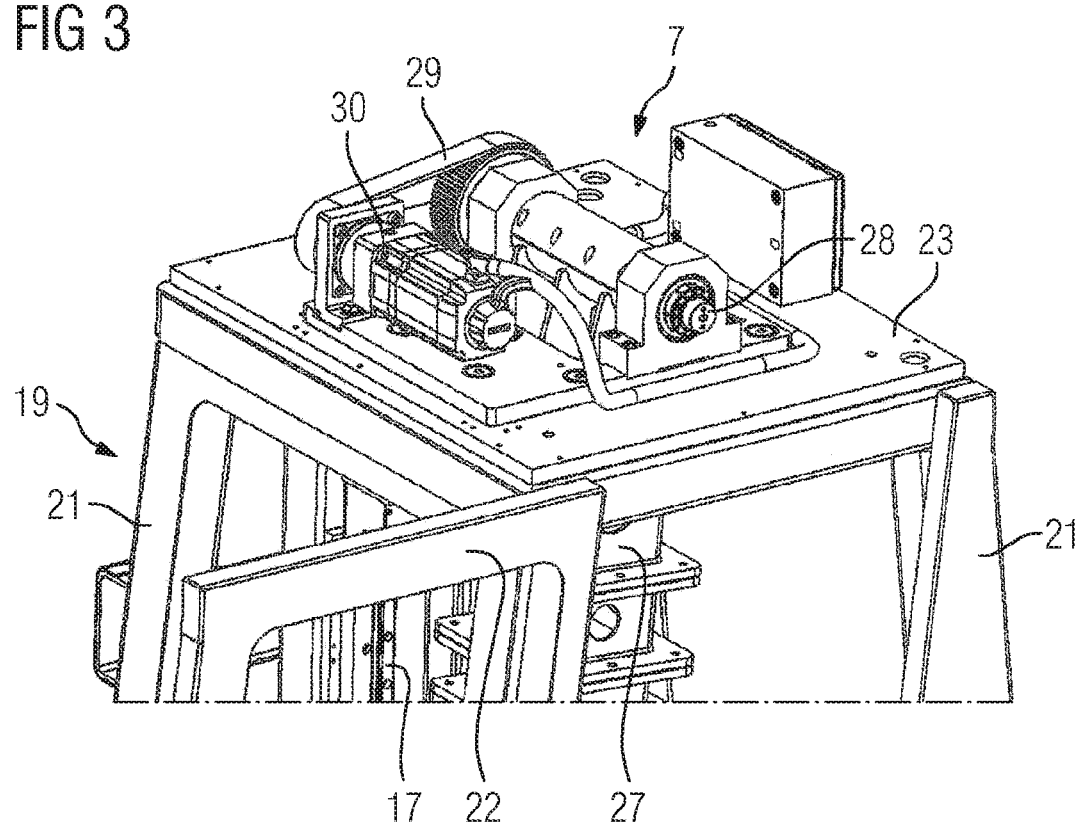
FIG. 3 shows a perspective plan view of the upper part of the grinding machine shown in FIG. 1, which view shows a workpiece drive unit.
Figure 4:
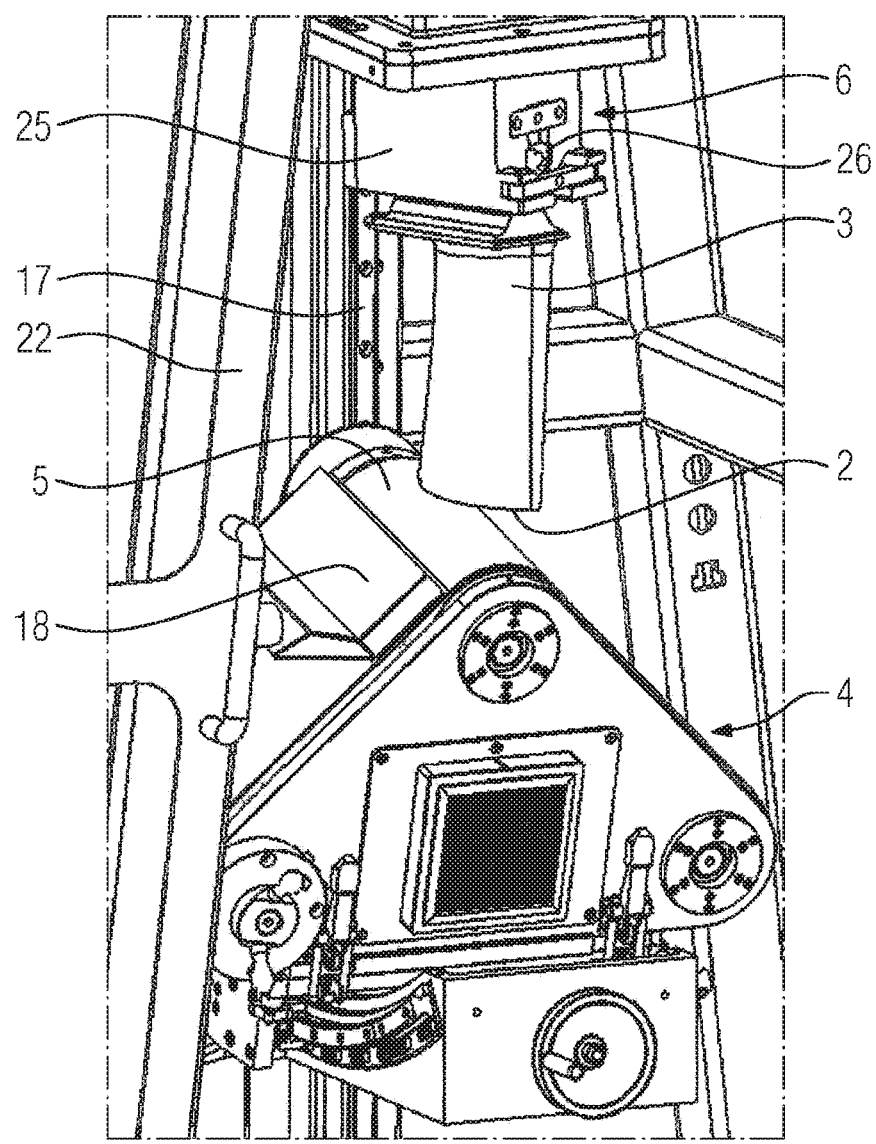
FIG. 4 shows an enlarged view of a grinding unit and a workpiece mounting device of the grinding machine shown in FIG. 1.
Figure 5:
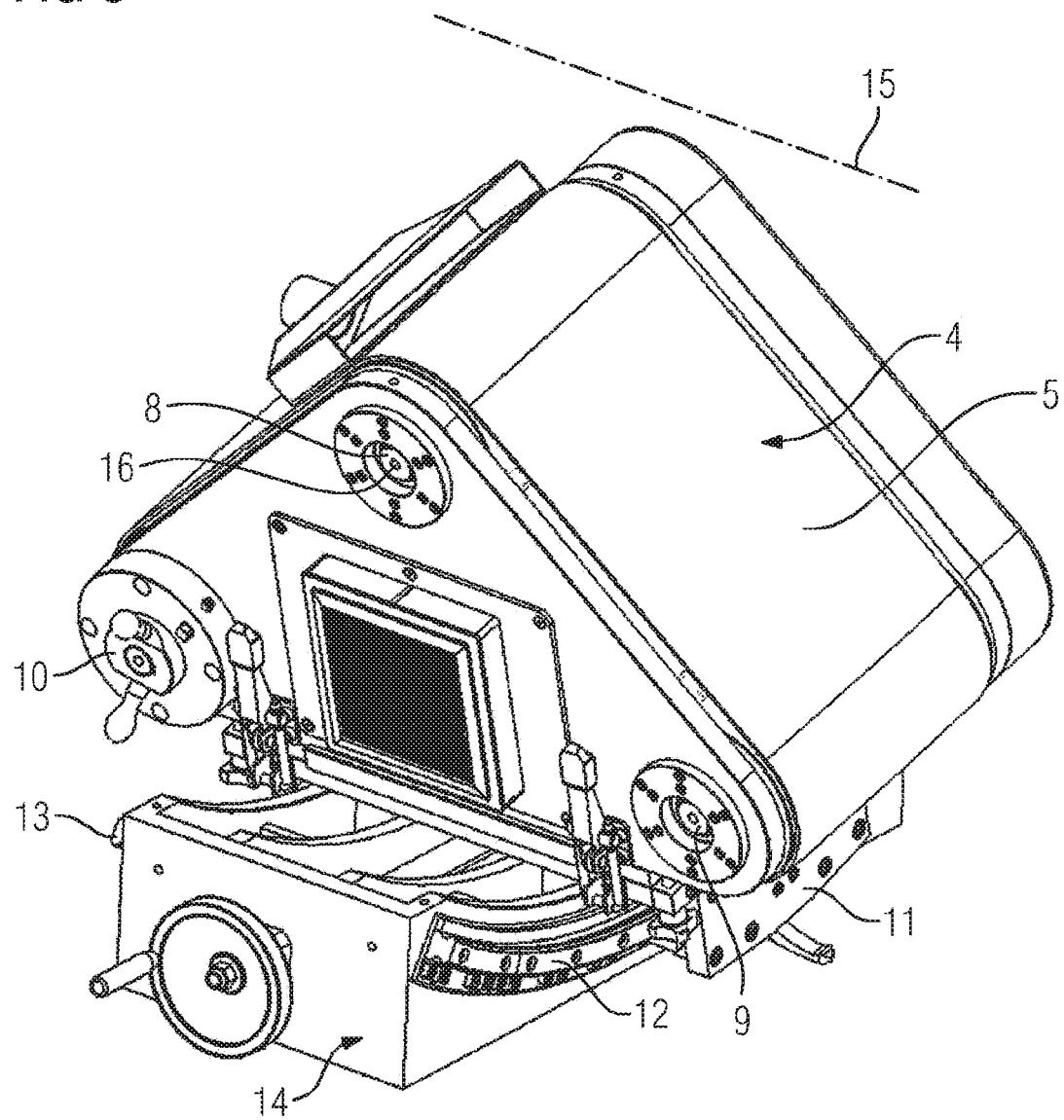
FIG. 5 shows a perspective view of the grinding unit shown in FIG. 4 and arranged on a pivoting device.

For machining a feathered edge 2 of a rotor blade 3, the rotor blade 3 is mounted in the clamping device 25 of the workpiece mounting device 6 in a first step. Next, a desired adjustment of the contact roller 8 of the grinding unit 4 is established by the grinding unit 4 being pivoted around the pivot axis 15 of the pivoting device 14. In a further step, the clamping device 25, together with the rotor blade 3 retained thereon, is pivoted from the vertical position, as is shown in FIG. 2. The grinding unit 4 is then moved vertically along the linear guide 17 in order to establish the desired feed in this way. Now, the grinding tool 5 of the grinding unit 4 is driven, whereupon the clamping device 19, together with rotor blade 3 retained thereon, is pivoted around the pivot axis 28 of the workpiece drive unit 7 using the drive 30. In the course of this pivoting movement, the feathered edge 2 of the rotor blade 3 is guided over the grinding tool 5 so that material removal takes place. In the course of this material removal, the feathered edge 2 obtains the shape of a tapered section. The chips which accumulate during the metal-removing machining are sucked up via the suction head 18.

Although the invention has been illustrated and described in greater detail with reference to the preferred exemplary embodiment, the invention is not limited to the examples disclosed, and further variations can be inferred by a person skilled in the art, without departing from the scope of protection of the invention.

For the sake of clarity, it is to be understood that the use of "a" or "an" throughout this application does not exclude a plurality, and "comprising" does not exclude other steps or elements.

The invention claimed is:

1. A grinding machine for machining a feathered edge of a rotor blade, comprising:
    a grinding unit with a driven grinding tool;
    a workpiece mounting device, which is adapted for mounting of a rotor blade to be ground; and
    a workpiece drive unit which is designed for moving the workpiece mounting device, together with a rotor blade mounted on the workpiece mounting device, relative to the driven grinding tool for the purpose of metal-removing machining of a feathered edge of the rotor blade mounted on the workpiece mounting device;
    wherein the workpiece drive unit has a pivot axis on which the workpiece mounting device is retained in such a way that the feathered edge of the rotor blade mounted on the workpiece mounting device is brought into engagement with the grinding tool in the course of a pivoting movement of the workpiece mounting device around the pivot axis, and
    a pivoting device on which the grinding unit is pivotably mounted for adjusting a longitudinal axis of the driven grinding tool with regard to a longitudinal-axis basic position.

2. The grinding machine as claimed in claim 1, wherein the grinding tool is a cylindrically designed grindstone or a driven grinding belt which is guided over a contact roller and also over at least one deflection roller.

3. The grinding machine as claimed in claim 2, wherein a longitudinal axis of the cylindrically designed grindstone or a longitudinal axis of the contact roller is arranged parallel to the pivot axis of the workpiece drive unit at least in a longitudinal-axis basic position.

4. The grinding machine as claimed in claim 1, wherein the pivot axis of the workpiece drive unit and the pivot axis of the pivoting device are arranged perpendicularly to each other.

5. The grinding machine as claimed in claim 1, further comprising a vertically extending linear guide along which the grinding unit can move upward and downward.

6. The grinding machine as claimed in claim 1, wherein a suction head of a suction unit provision is arranged in a region of the grinding unit.

7. The grinding machine as claimed in claim 1, wherein the pivot axis of the workpiece drive unit is mounted in a stationary manner.

8. The grinding machine as claimed in claim 1, further comprising an externally accessible machine booth, in which the grinding unit and the workpiece mounting device are arranged.

9. The grinding machine as claimed in claim 8, wherein the externally accessible machine booth has a cover plate on which the workpiece drive unit is arranged.

10. The grinding machine as claimed in claim 1, wherein of the grinding machine is a transportable design as a whole.

11. A method for machining a feathered edge of a rotor blade, using a grinding machine as claimed in claim 1, in which the feathered edge of the rotor blade is brought into contact with the grinding tool in a course of a pivoting movement of the rotor blade around the pivot axis.

12. The method as claimed in claim 11, wherein the feathered edge is brought into contact with the grinding tool in the course of the pivoting movement in such a way that the feathered edge obtains a shape of a tapered section.

13. A transportable grinding machine, comprising:
    a machine booth having at least two sidewalls and a transportation support point, wherein the transportation support point is at least one of an eye for receiving a lift strap and a plate for engaging a forklift,
    a grinding unit positioned within the at least two sidewalls of the machine booth,
    a workpiece mounting device positioned within the machine booth, wherein the workpiece mounting device includes a clamping device configured to clamp a blade root or a rotor blade, wherein the workpiece mounting device is moveably attached to a pivot axis of a workpiece drive unit, wherein the workpiece drive unit is configured to move the workpiece mounting device around the pivot axis of the workpiece drive unit such that an edge of the rotor blade contacts the grinding unit.

14. The transportable grinding machine as claimed in claim 13, wherein the grinding unit has a carriage moveably mounted onto a pivoting device.

15. The transportable grinding machine as claimed in claim 14, wherein the pivot axis of the workpiece drive unit and a pivot axis of the pivoting device are arranged perpendicularly to each other.

16. The transportable grinding machine as claimed in claim 14, further comprising a vertically extending linear guide along which the carriage of the grinding unit can move upward and downward.

17. The transportable grinding machine as claimed in claim 13, wherein a suction head of a suction unit is arranged proximate to the grinding unit.

18. The transportable grinding machine as claimed in claim 13, wherein the pivot axis of the workpiece drive unit is mounted in a stationary manner.

19. The transportable grinding machine as claimed in claim 13, wherein the machine booth also has a cover plate on which the workpiece drive unit is arranged.

* * * * *